United States Patent [19]

Takikawa

[11] Patent Number: 4,900,180
[45] Date of Patent: Feb. 13, 1990

[54] STRUCTURE FOR CONNECTING BRANCH PIPE IN HIGH-PRESSURE FUEL MANIFOLD

[75] Inventor: Kazunori Takikawa, Numazu, Japan
[73] Assignee: Usui Kokusai Sangyo Kaisha Ltd., Sunto, Japan
[21] Appl. No.: 211,581
[22] Filed: Jun. 27, 1988
[30] Foreign Application Priority Data
Jun. 29, 1987 [JP] Japan .................. 62-99725[U]
[51] Int. Cl.$^4$ .................. F16B 7/08; F16B 9/00
[52] U.S. Cl. .................. 403/233; 403/191; 403/234; 403/235; 403/254; 403/263; 285/156; 285/199; 285/332; 285/357
[58] Field of Search .............. 285/156, 197, 357, 348, 285/189, 333, 353, 393, 388, 354, 332, 199, 386; 403/191, 234, 235, 233, 253, 254, 263, 241, 190, 392

[56] References Cited
U.S. PATENT DOCUMENTS

| | | | |
|---|---|---|---|
| 1,186,325 | 6/1916 | Metzger | 285/388 |
| 1,803,577 | 5/1931 | Weatherhead | 285/156 |
| 2,396,163 | 3/1946 | Dies | 285/156 |
| 4,073,513 | 2/1978 | Blakeley | 285/93 |
| 4,586,733 | 5/1986 | Anderson, Jr. | 285/12 |

Primary Examiner—Randolph A. Reese
Assistant Examiner—Franco Deliguori
Attorney, Agent, or Firm—Anthony J. Casella; Gerald E. Hespos

[57] ABSTRACT

A structure for connecting a branch pipe in a high-pressure fuel manifold employs a nut to fasten the branch pipe to a main pipe, the nut having threaded surfaces which are simultaneously brought into thread engagement with a collar member fitted on the branch pipe at the neck portion contiguous with the top joint portion thereof which is brought into contact with the main pipe and with a coupling member which is secured to the main pipe in such a manner as to surround the peripheral wall thereof. Therefore, it becomes unnecessary to conduct a welding operation which has heretofore been needed to connect the joint portion of the branch pipe to the main pipe. The connecting structure satisfactorily endures ultra-high fluid pressure even under vibrations. In addition, there is no fear of fuel leaking out through the joint nor risk of the branch pipe coming off. It is also possible to reduce the torsional fatigue of the top portion of the branch pipe when tightly fastened to the main pipe to thereby prevent breakage of the branch pipe at the neck portion which is contiguous with the top portion.

9 Claims, 1 Drawing Sheet

STRUCTURE FOR CONNECTING BRANCH PIPE IN HIGH-PRESSURE FUEL MANIFOLD

BACKGROUND OF THE INVENTION

1. Field of the Invention

The present invention relates to a structure for connecting branch pipes in a high-pressure fuel manifold generally employed in diesel engines of various kinds of vehicle or the like. More particularly, the present invention pertains to an improvement in the structure for connecting a branch pipe in a high-pressure fluid manifold which is disposed near such a diesel engine so as to serve as a passage for supplying the engine with fuel under an ultra-high pressure, i.e., 1000 kg/cm$^2$ or more.

2. Description of the Related Art

FIG. 4 shows one example of the conventional connecting structure of the type described above. As illustrated, a plurality of through-holes 13 are provided in the peripheral wall of a main pipe 11 for supplying high-pressure fuel in such a manner that the through-holes 13 are spaced apart from each other in the longitudinal direction of the main pipe 11 and are communicated with a flow passage 12 defined inside the main pipe 11, and a branch pipe 14 is fitted into each through-hole 13 and brazed or welded to the main pipe 11 as shown by the reference symbol W, thus connecting the branch pipe 14 to the main pipe 11.

The above-described prior art suffers, however, from the problem that leakage of fuel through the weld W or coming off of the branch pipe 14 often occurs as the weld strength deteriorates due to the above-described fitting engagement between the branch pipe 14 and the main pipe 11 and incomplete welding despite the fact that there are demands for sufficiently high weld strength at the joint to endure the repetitive supply of fuel under ultra-high fluid pressure, i.e., 1000 kg/cm$^2$ or more, during use, as a result of the improvement in the engine mechanism, and also vibrations applied from the engine.

SUMMARY OF THE INVENTION

In view of the above-described problems of the prior art, it is a primary object of the present invention to provide a connecting structure which enables a branch pipe to be readily connected to a main pipe without the need for welding or the like at the joint and permits the joint to satisfactorily endure the above-described ultra-high fluid pressure even under vibrations and which has no fear of the fuel leaking out through the joint nor risk of the branch pipe coming off the main pipe and which further enables a reduction in the torsional fatigue of the top portion of the branch pipe when tightly fastened to the main pipe to thereby prevent breakage of the branch pipe at the neck portion which is contiguous with the top portion.

To this end, the present invention provides a structure for connecting branch pipes in a high-pressure fuel manifold in which each branch pipe is connected to a main pipe for supplying fuel under high pressure through one of a plurality of through-holes which are provided in the peripheral wall of the main pipe in such a manner that the through-holes are spaced apart from each other in the longitudinal direction of the main pipe and are communicated with a flow passage defined inside the main pipe, wherein the improvement comprises: a recessed pressure bearing surface provided at the outer end of each of the through-holes so as to open outward divergently; a coupling member having a threaded bore at one lateral end thereof and an engagement bore axially provided therein, the coupling member being secured at the engagement bore to the outer peripheral wall of the main pipe in such a manner that the pressure bearing surface is surrounded by the wall that defines the threaded bore; the branch pipe having at its end a frusto-conical or arcuated pressing top portion and a collar member fitted thereon at the neck portion contiguous with the top portion, the collar member having a threaded surface defined by its outer periphery; and a nut provided on the branch pipe, the nut having threaded surfaces respectively provided on its inner and outer peripheries which are threaded in the directions opposite to each other, so that the pressing top portion of the branch pipe is brought into contact and thereby engaged with the pressure bearing surface and, in this state, the nut is tightened such that the inner and outer threaded surfaces of the nut are respectively brought into thread engagement with the threaded surface of the collar member and the threaded bore provided in the coupling member, thereby fastening the branch pipe to the main pipe. The collar member may be fitted on the outer periphery of the branch pipe through a sleeve washer which is tightly fitted on the neck portion contiguous with the pressing top portion.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote line elements and, in which.

DESCRIPTION OF THE PREFERRED EMBODIMENT

Preferred embodiments of the present invention will be described hereinunder in detail with reference to the accompanying drawings.

Figure 1:
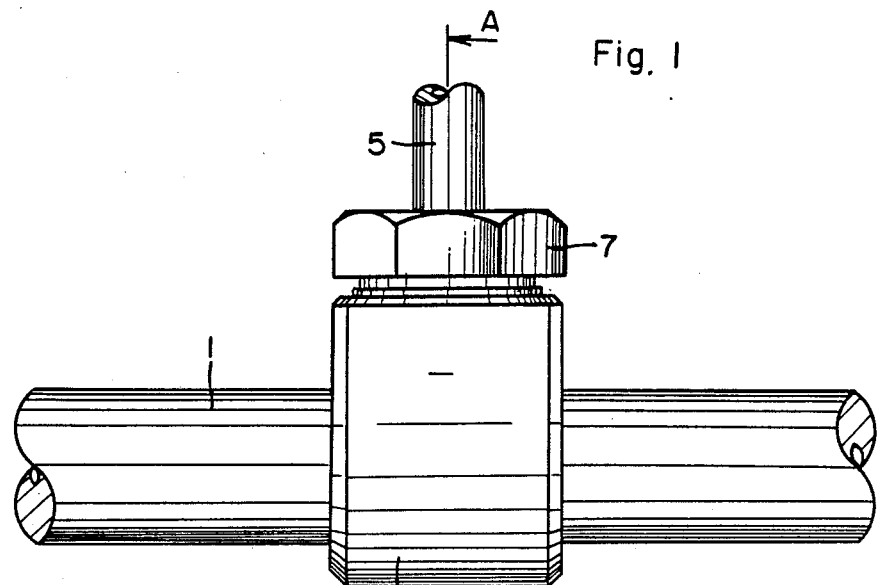
FIG. 1 is a front view of one embodiment of the structure for connecting branch pipes in a high-pressure fuel manifold according to the present invention.
Figure 2:
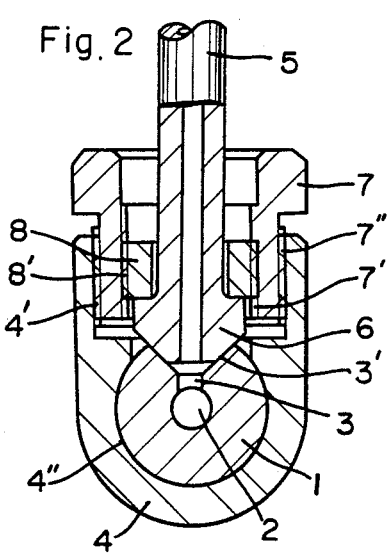
FIG. 2 is a partly-sectioned side view of the embodiment, taken along the line A—A of FIG. 1.
Figure 3:
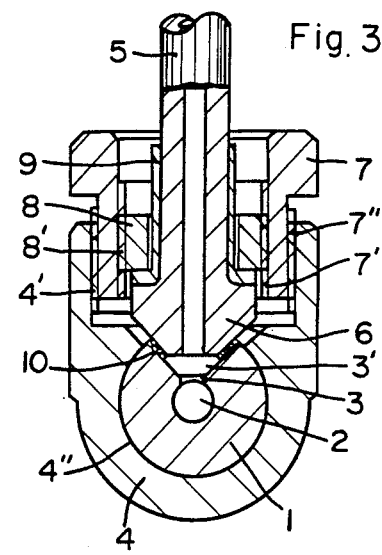
FIG. 3 shows another embodiment of the present invention, which is equivalent to FIG. 2.
Figure 4:
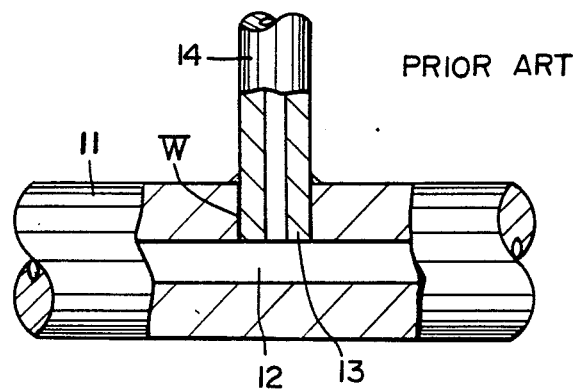
FIG. 4 is a partly-sectioned front view of a prior art.

Referring to FIGS. 1 to 3, the reference numeral 1 denotes a main pipe defined by a metal pipe having a relatively small outside diameter, i.e., about 20 mm, and a relatively large wall thickness, i.e., about 6 mm, and a plurality of through-holes 3 are provided in the peripheral wall of the main pipe 1 in such a manner that the through-holes 3 are spaced apart from each other in the longitudinal direction of the main pipe 1 and are communicated with a flow passage 2 defined inside the main pipe 1, each through-hole 3 having at its outer end a recessed pressure bearing surface 3' which opens outward divergently. The reference numeral 4 denotes a coupling member defined by a relatively short annular member or ring-shaped member having a square cross-section which is prepared as a separate member. The coupling member 4 has a threaded bore 4' at its upper end as viewed in the figures and is secured at its axial engagement bore 4'' to the outer peripheral wall of the main pipe 1 by welding or other similar means in such a manner that the pressure bearing surface 3' is surrounded by the wall that defines the threaded bore 4'. According to one embodiment of the present invention, a branch pipe 5 has a frustoconical or arcuated pressing top portion 6 provided at its end and a collar member 8 fitted thereon at the neck portion contiguous with the pressing top portion 6, the collar member 8 having a threaded surface 8' defined by its outer periphery, and this top portion 6 is brought into contact and thereby engaged with the pressure bearing surface 3' (see FIG. 2). According to another embodiment of the present invention, the collar member 8 is fitted on the outer periphery of the branch pipe 5 through a sleeve washer 9 which is tightly fitted on the neck portion contiguous with the pressing top portion 6, and this top portion 6 is brought into contact and thereby engaged with the pressure bearing surface 3' (see FIG. 3). In either case, the branch pipe 5, which is in the above-described state, is then fastened to the main pipe 1 by tightening a nut 7 provided on the branch pipe 5 such that the inner and outer peripheral surfaces 7' and 7" of the nut 7 which are threaded in the directions opposite to each other are simultaneously brought into thread engagement with the threaded surface 8' of the collar member 8 and the threaded bore 4' provided in the coupling member 4. It should be noted that a seal 10, for example, a copper packing member, may be interposed between the pressing top portion 6 and the pressure bearing surface 3'.

Thus, the pressing top portion 6 of the branch pipe 5 is brought into contact and thereby engaged with the pressure bearing surface 3' by means of the coupling member 4 secured to the main pipe 1 in such a manner as to wrap the peripheral wall thereof and the top portion 6 is then strongly pressed against the pressure bearing surface 3' by tightening the nut 7 having the threaded surfaces 7' and 7" which are simultaneously brought into thread engagement with the collar member 8 and the coupling member 4, respectively. In this way, the branch pipe 5 is firmly connected to the main pipe 1. In addition, the washer function of the collar member 8 enables a reduction in the torsional fatigue of the branch pipe 5 at the neck portion contiguous with the top portion 6.

As has been described above, according to the present invention, the branch pipe 5 is connected to the main pipe 1 by means of the nut 7 having the threaded surfaces 7' and 7" which are simultaneously brought into thread engagement with the collar member 8 which is fitted on the branch pipe 5 at the neck portion contiguous with the top portion 6 and which has the threaded surface 8' defined by its outer periphery and with the coupling member 4 which is secured to the main pipe 1 in such manner as to surround the peripheral wall thereof. Therefore, it becomes unnecessary to conduct a welding operation which has heretofore been needed to connect the joint portion of the branch pipe to the main pipe, and it is possible to facilitate the connecting operation by means of the thread engagement using the nut 7. Further, since the coupling member 4 is secured to the main pipe 1 in such a manner that the main pipe 1 is wrapped with the coupling member 4 by being received in the engagement bore 4", the connecting structure can satisfactorily endure ultra-high fluid pressure even under vibrations. In addition, there is no fear of fuel leaking out through the joint nor risk of the branch pipe 5 coming off. Further, it is possible to reduce the torsional fatigue of the top portion of the branch pipe when tightly fastened to the main pipe to thereby prevent breakage of the branch pipe at the neck portion which is contiguous with the top portion. Thus, the present invention provides a considerably advantageous connecting structure.

Although the present invention has been described through specific terms, it should be noted here that the described embodiments are not necessarily exclusive and various changes and modifications may be imparted thereto without departing from the scope of the invention which is limited solely by the appended claims.

What is claimed is:

1. A structure for connecting branch pipes in a high-pressure fuel manifold in which each branch pipe is connected to a main pipe for supplying fuel under high pressure through one of a plurality of through-holes which are provided in the peripheral wall of said main pipe in such a manner that said through-holes are spaced apart from each other in the longitudinal direction of said main pipe and are communicated with a flow passage defined inside said main pipe, wherein the improvement comprises: a recessed pressure bearing surface provided at the outer end of each of said through-holes so as to open outward divergently; a coupled member having an engagement bore axially extending therethrough, and a threaded bore extending laterally into the coupling member to intersect the axial bore, said coupling member being secured to the outer peripheral wall of said main pipe such that said pressure bearing surface is surrounded by said threaded bore; said branch pipe having at its end an enlarged pressing top portion and a neck portion contiguous with said enlarged pressing top portion, said enlarged pressing top portion of said branch pipe defining a shoulder adjacent said neck and a converging tip conforming to the shape of the outwardly divergent pressure bearing surface and being seated against said pressure bearing surface, a collar member having an inner cylindrical surface slidably fitted around the neck of the branch pipe, and an end engaged against the shoulder of the branch pipe, said collar member further having a threaded surface defined by its outer periphery; and a nut provided around the collar member and the branch pipe, said nut having threaded surfaces respectively provided on its inner and outer peripheries which are threaded in the directions opposite to each other, the inner and outer threaded surfaces of said nut respectively being in thread engagement with the threaded surface of said collar member and said threaded bore provided in said coupling member, whereby rotation of the nut moves the collar relative to the coupling member and against the shoulder of the branch pipe thereby fastening the tip of said branch pipe tightly against the pressure bearing surface of said main pipe.

2. A connecting structure according to claim 1, wherein said collar member is fitted on the outer periphery of said branch pipe through a sleeve washer which is tightly fitted on the neck portion contiguous with said pressing top portion.

3. A connecting structure according to claim 1 wherein the recessed pressure bearing surface of each through hole in the main pipe is of generally frusto-conical configuration.

4. A connecting structure according to claim 3 wherein the converging tip of the enlarged pressing top portion of said branch pipe is of a generally frusto-conical configuration conforming to the configuration of the pressure bearing surface on the main pipe.

5. A connecting structure according to claim 1 wherein the coupling member is secured to the outer peripheral wall of said main pipe by welding.

6. A connecting structure according to claim 1 wherein the main pipe has a peripheral wall thickness equal to approximately 60% of the radius of the main pipe.

7. A connecting structure according to claim 1 further comprising a seal disposed intermediate the tip of the branch pipe and the pressure bearing surface of the main pipe, and conforming to the shapes thereof, said seal being tightly pressed intermediate the tip of the branch pipe and the pressure bearing surface of the main pipe.

8. A connecting structure according to claim 7 wherein the seal defines a copper packing member.

9. A connecting structure according to claim 1 further comprising a sleeve washer intermediate the collar member and the neck and shoulder of the branch pipe.

* * * * *